(12) United States Patent
Kuhl

(10) Patent No.: US 6,769,862 B1
(45) Date of Patent: Aug. 3, 2004

(54) APPARATUS AND METHOD FOR PLACING HORIZONTALLY ORIENTED FLATS INTO VERTICALLY EXTENDING STACKS THEREOF

(76) Inventor: Jeffrey B. Kuhl, 61 Kuhl Rd., Flemington, NJ (US) 08822

( * ) Notice: Subject to any disclaimer, the term of this patent is extended or adjusted under 35 U.S.C. 154(b) by 0 days.

(21) Appl. No.: 10/308,762

(22) Filed: Dec. 3, 2002

(51) Int. Cl.[7] ............................................. B65G 57/00
(52) U.S. Cl. ................ 414/789; 414/788.2; 414/789.8; 414/789.9; 414/790; 414/790.1; 414/790.4; 414/790.5; 414/790.6; 414/790.8; 414/791
(58) Field of Search ............................. 414/788.2, 789, 414/789.8, 789.9, 790, 790.1, 790.4, 790.5, 790.6, 790.8, 791, 791.1

(56) References Cited

U.S. PATENT DOCUMENTS

| | | | | |
|---|---|---|---|---|
| 2,414,059 A | * | 1/1947 | Powers ..................... | 414/790.6 |
| 3,528,565 A | * | 9/1970 | Binzoni ..................... | 414/789 |
| 3,643,816 A | * | 2/1972 | Jacobsen .................. | 414/788.9 |
| 4,124,128 A | * | 11/1978 | Adams et al. ............ | 414/788.3 |
| 4,302,142 A | | 11/1981 | Kuhl et al. | |
| 4,311,475 A | * | 1/1982 | Imai ........................... | 493/142 |
| 4,328,908 A | | 5/1982 | Temming | |
| 4,355,731 A | | 10/1982 | Carroll et al. | |
| 4,537,208 A | | 8/1985 | Kuhl | |
| 4,650,390 A | | 3/1987 | Kay et al. | |
| 4,760,777 A | * | 8/1988 | Welsh ....................... | 99/450.2 |
| 4,765,487 A | | 8/1988 | Bliss | |
| 4,787,799 A | | 11/1988 | Platteschorre | |
| 4,844,188 A | | 7/1989 | Pirc et al. | |
| 4,865,515 A | * | 9/1989 | Dorner et al. ........... | 414/788.2 |
| 4,917,559 A | | 4/1990 | van der Schoot | |
| 4,938,657 A | * | 7/1990 | Benson et al. ........... | 414/790.4 |
| 4,955,783 A | * | 9/1990 | Grazia ...................... | 414/795 |
| 4,966,521 A | * | 10/1990 | Frye et al. ............... | 414/788.8 |
| 4,995,785 A | | 2/1991 | Platteschorre | |
| 5,007,785 A | | 4/1991 | van der Schoot | |
| 5,088,883 A | * | 2/1992 | Focke et al. ............. | 414/795 |
| 5,104,115 A | | 4/1992 | Saito et al. | |
| 5,117,614 A | * | 6/1992 | Johnsen .................... | 53/540 |
| 5,172,909 A | | 12/1992 | Ricciardi | |
| 5,234,313 A | * | 8/1993 | DelDuca ................... | 414/800 |
| 5,480,280 A | * | 1/1996 | Bordon ..................... | 414/798.1 |
| 5,791,867 A | | 8/1998 | Kuhl | |
| 5,807,065 A | | 9/1998 | Kuhl | |
| 5,842,695 A | | 12/1998 | McVeigh | |
| 5,899,452 A | | 5/1999 | Walsh | |
| 5,944,478 A | | 8/1999 | Colombo et al. | |
| 5,961,273 A | | 10/1999 | Colombo et al. | |
| 6,053,695 A | * | 4/2000 | Longoria et al. ........ | 414/790.8 |
| 6,152,683 A | * | 11/2000 | Linder ...................... | 414/801 |
| 6,155,153 A | * | 12/2000 | Davison ................... | 83/425 |
| 6,241,458 B1 | * | 6/2001 | Berndl ..................... | 414/790.3 |

* cited by examiner

*Primary Examiner*—Douglas Hess
(74) *Attorney, Agent, or Firm*—Sperry, Zoda & Kane

(57) ABSTRACT

An apparatus for stacking horizontally conveyed individual flats into vertically extending stacks including a stacking housing with an upper station for receiving the flats singly and releasing them downwardly into an intermediate station wherein multiple flats are accumulated and the accumulated grouping is then released downwardly to form an overall vertically extending stack of twenty flats or more for exit conveying. A control system is further disclosed including control plates, link arms and retaining/releasing arms for controlling downward movement of the flats within the stacking housing.

32 Claims, 3 Drawing Sheets

APPARATUS AND METHOD FOR PLACING HORIZONTALLY ORIENTED FLATS INTO VERTICALLY EXTENDING STACKS THEREOF

BACKGROUND OF THE INVENTION

1. Field of the Invention

The present invention deals with the field of automated conveying systems for handling of large horizontally extending members which are designed to hold a plurality of individual discreet items. An example of such an item is a flat which is designed to hold a plurality of eggs such as a five by five or six by six array thereof. These flats nest within one another and need to be stacked and destacked for various stages of operation such as cleaning, sanitizing, drying and handling to facilitate reuse. The present invention provides a unique apparatus for high speed stacking of individual flats such as would be encountered immediately after washing of the individual flats. The flats can be stacked vertically to a height of 20, 30 or more and then can proceed to a drying apparatus such as a spin dryer for simultaneous drying thereof. The washing, however, needs to be done individually and for this reason the flats need to be separated and conveyed through the washing station individually in an unstacked position to facilitate effective washing. The present invention provides a unique apparatus solely for the purpose of taking these single flats oriented horizontally and traveling upon a conveyor and stacking thereof vertically and again positioning them on a conveyor for transport to a drying station.

2. Description of the Prior Art

Numerous devices have been used for the purpose of stacking, unstacking or other handling of flats or other horizontally oriented members which are preferably nestable and can receive a plurality of discreet items therein such as eggs or the like. Examples of patents which have been granted on such apparatus include U.S. Pat. No. 2,915,308 patented Dec. 1, 1959 to J. C. Matzen on "Automatic Feeding Machines"; and U.S. Pat. No. 3,053,529 patented Sep. 11, 1962 to M. B. Dunn and assigned to Memco Machinery Corporation on a "Blank Feeding Apparatus For Box Erecting Machine"; and U.S. Pat. No. 3,130,967 patented Apr. 28, 1964 to J. Le Brell and assigned to Alton Box Board Company on a "Hopper Feed For Carton Blanks"; and U.S. Pat. No. 3,718,217 patented Feb. 27, 1973 to A. R. Stobb et al on an "Apparatus For Feeding Signatures"; and U.S. Pat. No. 3,724,640 patented Apr. 3, 1973 to H. Rapparlie and assigned to Licentia Patent-Verwaltungs-GmbH on a "Device For Forming Stacks From A Flow Of Consecutively Furnished Flat Items"; and U.S. Pat. No. 3,774,783 patented Nov. 27, 1973 to A. H. Miller et al and assigned to Libbey-Owens-Ford Company on an "Apparatus For Handling Sheet Material"; and U.S. Pat. No. 3,792,784 patented Feb. 19, 1974 to J. H. Mosterd on a "Device For Handling Egg Trays"; and U.S. Pat. No. 3,945,633 patented Mar. 23, 1976 to A. A. Knopp and assigned to Harris-Intertype Corporation on a "Hopper Loader"; and U.S. Pat. No. 4,164,296 patented Aug. 14, 1979 to C. I. Trees and assigned to The Lodge & Shipley Company on an "Apparatus For Transferring And Rotating Articles"; and U.S. Pat. No. 4,293,272 patented Oct. 6, 1981 to A. Jellema and assigned to Staalkat B. V. on a "Method And Apparatus For Denesting A Plurality of Containers Filled With Articles"; and U.S. Pat. No. 4,298,156 patented Nov. 3, 1981 to R. F. Reifers et al and assigned to Diamond International Corporation on "Nestable And Denestable Molded Egg Cartons"; and U.S. Pat. No. 4,302,142 patented Nov. 24, 1981 to H. Y. Kuhl et al and assigned to Kuhl Corporation on an "Apparatus For Automatically Loading Eggs Directly From Stacks Of Egg-Filled Flats"; and U.S. Pat. No. 4,328,908 patented May 11, 1982 to L. J. Temming and assigned to Staalkat B. V. on an "Apparatus For Denesting And Delivering The Bottom One Of A Stack Of Trays For Eggs"; and U.S. Pat. No. 4,355,731 patented Oct. 26, 1982 to J. C. Carroll et al and assigned to Phillips Petroleum Company on an "Egg Supporting Tray"; and U.S. Pat. No. 4,537,208 patented Aug. 27, 1985 to H. Y. Kuhl on a "Horizontal Flat Destacker"; and U.S. Pat. No. 4,650,390 patented Mar. 17, 1987 to T. Kay et al and assigned to Wand Tool Company, Inc. on "Stacker-Loader For Stacking Double Sided Printed Circuit Boards"; and U.S. Pat. No. 4,765,487 patented Aug. 23, 1988 to G. N. Bliss and assigned to Diamond Automations, Inc. on an "Automatic Article Stacking System"; and U.S. Pat. No. 4,787,799 patented Nov. 29, 1988 to K. Platteschorre on an "Egg Carton Stacking-Loading Device And Method"; and U.S. Pat. No. 4,844,188 patented Jul. 4, 1989 to V. Pirc et al and assigned to Pitney Bowes Inc. on an "Apparatus And Method Of Transporting Flats Across A Scale"; and U.S. Pat. No. 4,917,559 patented Apr. 17, 1990 to J. van der Schoot and assigned to Staalkat B. V. on a "Method And Apparatus Of Loading Or Unloading A Plurality Of Stacks Of Trays From A Container"; and U.S. Pat. No. 4,995,785 patented Feb. 26, 1991 to K. Platteschorre on an "Egg Carton Stacking-Loading Device And Method"; and U.S. Pat. No. 5,007,785 patented Apr. 16, 1991 to J. van der Schoot and assigned to Staalkat B. V. on a "Method And Apparatus For Unloading Stacks Of Trays"; and U.S. Pat. No. 5,104,115 patented Apr. 14, 1992 to M. Saito et al and assigned to Tokyo Electric Co., Ltd. on a "Stacker For Stacking And Issuing Sets Of Cards"; and U.S. Pat. No. 5,172,909 patented Dec. 22, 1992 to M. Ricciardi and assigned to Bell & Howell Company on a "Secondary Pivotal Drive Stacker Roller Enabling Stacking of Small And Large Documents"; and U.S. Pat. No. 5,791,867 patented Aug. 11, 1998 to J. B. Kuhl on an "Apparatus For Automatically Unstacking Of Trays From A Vertically Extending Interlocking Stack Thereof"; and U.S. Pat. No. 5,807,065 patented Sep. 15, 1998 to J. B. Kuhl on an "Apparatus For Automatically Unstacking Horizontal Lid Members From A Vertically Extending Stack Thereof"; and U.S. Pat. No. 5,842,695 patented Dec. 1, 1998 to D. J. McVeigh and assigned to Xerox Corporation on a "Large Or Flimsy Sheets Stacking System For Disk Type Inverter-Stacker"; and U.S. Pat. No. 5,899,452 patented May 4, 1999 to M. Walsh and assigned to Coin Bill Validator, INc. on a "Stacker Mechanism For Stacking Bank Notes"; and U.S. Pat. No. 5,944,478 patented Aug. 31, 1999 to E. Colombo et al and assigned to Techint Compagnia Tecnica Internazionale S.p.A. on an "Automatic Stacker With Rotary Heads For Stacking, In An Ordered Manner In Alternate Upright And Inverted Layers, Metal Sections Originating From A Rolling Mill"; and U.S. Pat. No. 5,961,273 patented Oct. 5, 1999 to E. Coilombo et al and assigned to Techint compagnia Tecnica Internazionale S.p.A. on a "Stacker For The Stacking Of Metallic Section Bars In Alternating, Upright And Reverse Layers"; and U.S Pat. No. 6,241,458 patented Jun. 5, 2001 to E. H. Berndl and assigned to Skinetta Pac-Systeme Kiener GmbH & Co. on a "Stacker For Grouping And Stacking Substantially Flat Articles".

SUMMARY OF THE INVENTION

The present invention sets forth a uniquely defined apparatus for the purpose of placing horizontally oriented flats into vertically extending individual stacks thereof. Preferably the device includes a housing defining an inlet therein for receiving of these individual horizontally oriented stacks therethrough to facilitate positioning thereof into a vertically extending stack. The housing may preferably include an outlet for allowing exiting of the stack of flats after formed therefrom.

An inlet conveying device may also be included which is operative to transport the individual flats to the inlet of the housing for facilitating stacking therein. A stacking station is preferably defined within the housing which is adapted to receive flats from a position thereabove within the housing in registration therewith to facilitate vertical stacking of the horizontally oriented flats at this location.

An outlet conveying device is also included which extends into the stacking station within the housing through the outlet which is defined therein. This outlet conveyor will extend to the stacking station and will be operable to receive a stack of flats therefrom for exit conveying thereof through the outlet of the housing. The outlet conveyor extends below the stacking station preferably. Also preferably the stacking station is adapted to stack horizontally oriented stacks vertically directly upon the outlet conveyor in such a manner as to facilitate this exit conveying which takes place through the outlet defined in the housing.

An inlet delivery device is also included which is operative to urge movement of individual flats from the inlet conveyor into the housing. This inlet delivery enhancement device preferably includes a cylindrical roller brush positioned adjacent to the inlet conveyor which will contact flats being transported thereon to facilitate urging thereof for movement through the inlet into the housing. A roller drive may be operatively attached with respect to the cylindrical roller brush for driving rotatable movement thereof in order to facilitate movement of flats to move from a position on the inlet conveyor into the housing through the inlet.

An upper receiving station is defined within the housing adjacent to the inlet thereof and is operative to receive flats one at a time therewithin for orientation thereof above the stacking station and in vertical registration therewith. This upper receiving station preferably includes an upper retaining device selectively movable pivotally between an upper retaining position for holding of a flat within the upper receiving station and an upper releasing position for release of a single flat to allow downward movement thereof.

The upper retaining means preferably includes an upper rod pivotally mounted movably within the housing at a location laterally adjacent to a flat positioned within the upper retaining station. This upper rod will preferably include a first upper rod member mounted pivotally movable within the housing at a location laterally adjacent to a flat in the upper retaining position as well as a second upper rod member mounted pivotally movable within the housing at a position laterally adjacent to a flat positioned in the upper retaining station located at a position spatially distant from the position of the first upper rod member within the housing.

An upper arm mechanism is also included which is secured to the upper rod and is pivotally movable therewith between a flat retaining position extending below a flat for holding thereof in the upper receiving station means and a flat releasing position adjacent to a flat for allowing release of a flat downwardly therefrom. This upper arm mechanism preferably includes a first upper arm member secured to the first upper rod member and pivotally movable therewith between a flat retaining position extending below a flat for holding thereof in the upper receiving station and a flat releasing position adjacent a flat for allowing downward release therefrom. The upper arm mechanism further will preferably include a second upper arm member secured to the second upper rod and pivotally movable therewith between a flat retaining position extending below a flat for holding thereof in the upper receiving station and a flat releasing position adjacent a flat for allowing release thereof downwardly as necessary.

Furthermore the upper retaining mechanism can include a first upper control plate fixedly secured to the first upper rod member and pivotally movable therewith as well as a second upper control plate which is fixedly movable to the second upper rod member and pivotally movable therewith. An upper link may be included attached to the first upper control plate and the second upper control plate to be operative to cause simultaneous pivotal movement of these two parts together with respect to one another between the flat releasing position and the flat retaining position. This upper link is preferably movably attached to the first upper control plate and the second upper control plate to facilitate this coordinated movement thereof. Furthermore the upper link preferably is attached to the first upper control plate at a position above the first upper rod member and is attached to the second upper control plate at a position below the second upper rod member in order to facilitate coordinated pivotal movement of the first upper rod member and second upper rod member with respect to one another through the interconnection caused by the upper link means.

An intermediate accumulating station may be included located below the upper receiving station which is operative to receive individual flats moving downwardly from the upper retaining means of the upper receiving station for orientation thereof above the stacking station located therebelow and in vertical registration therewith. This intermediate accumulating station is preferably adapted to receive and retain a plurality of individual flats therewithin for simultaneous release together downwardly therefrom in order to facilitate stacking within the stacking station therebelow. The intermediate receiving station preferably includes an intermediate retaining device selectively movable pivotally between an intermediate retaining position for holding of at least one flat within the intermediate receiving station and an intermediate releasing position for release of at least one flat for allowing movement thereof downwardly to the stack station means located below. Preferably the number of flats retained prior to release within the intermediate station will be two or more.

The intermediate retaining mechanism includes an intermediate rod mounted pivotally movably within the housing at a location laterally adjacent to at least one flat positioned within the intermediate retaining means. The intermediate rod construction may include a first intermediate rod member being mounted pivotally movable within the housing at a location laterally adjacent to at least one flat positioned within the intermediate station. The intermediate rod mechanism may further include a second intermediate rod member mounted pivotally movable within the housing at a location laterally adjacent to a flat positioned within the intermediate retaining station at a position spatially distant from the first intermediate rod member with at least one flat positioned therebetween. The intermediate retaining device may further include an intermediate arm means secured to the intermediate rod mechanism and pivotally movable therewith between a flat retaining position extending below at least one flat for holding thereof in the intermediate receiving station means and a flat releasing position adjacent to at least one flat for allowing release thereof downwardly therefrom to the stacking station therebelow. The intermediate arm mechanism preferably includes a first intermediate arm member secured to the first intermediate rod member and pivotally movable therewith between a flat retaining position extending below at least one flat for holding thereof in the intermediate receiving station and a flat releasing position adjacent to at least one flat for allowing release thereof downwardly to the stacking station located therebelow. The intermediate arm mechanism may further include a second intermediate arm member secured to the second intermediate rod member and pivotally movable therewith between a flat retaining position extending below at least one flat for holding thereof in the intermediate receiving station and a flat releasing position adjacent at least one flat for allowing release thereof downwardly to the stack station therebelow. Further included can be a first intermediate control plate fixedly secured to the first intermediate rod member and pivotally movable therewith as well as a second intermediate control plate fixedly secured to the second intermediate rod member and pivotally movable therewith. Also preferably included is an intermediate link attached to the first intermediate control plate and a second intermediate control plate and operative to cause simultaneous pivotal movement of the first intermediate arm member and the second intermediate arm member between a flat releasing position and a flat retaining position thereof. The intermediate link is preferably movably attached to the first intermediate control plate and the second intermediate control plate to facilitate this coordinated movement therebetween. Furthermore the intermediate link preferably is attached to the first intermediate control plate above the location of the first intermediate rod member and is also attached to the second intermediate control plate below the second intermediate rod member in order to facilitate this coordinated pivotal movement of the first intermediate rod member and the second intermediate rod member simultaneously together in the opposite pivotal direction. The intermediate retaining device is preferably operative in the steady state position to be located in the retaining position and is operative to move to the releasing position only responsive to a plurality such as four flats being located within the intermediate accumulating station for allowing release therebelow. It is operative to return to the retaining position subsequent to release of all the flats within the station. Also included in the apparatus of the present invention may be an intermediate sensing device which monitors the presence of flats retained within the intermediate accumulating station and is operative to urge the movement of the intermediate retaining means to the releasing position only in the situation where a plurality of individual flats have been accumulated therein and more preferably only after at least four or more such flats are accumulated therewithin.

Also the apparatus of the present invention may include a stack sensing device which is operative to monitor the exiting of movement of a stack from the stack receiving station through the outlet and is operative to prevent the release of flats downwardly from the intermediate accumulating station toward the stacking station during exiting movement of a stack of flats from the stacking station moving outwardly toward and through the outlet of the housing.

In operation the apparatus of the present invention initially conveys horizontally oriented flats or trays one at a time into an upper receiving station of a stacker housing. This stack now within the upper receiving station will be registered vertically such that it is positioned directly above an intermediate accumulating station therebelow as well as directly above a stack station further therebelow but also located within the stacker housing. The stacks are released one at a time from the upper receiving station such that they move downwardly to be held within the intermediate accumulating station by an intermediate retaining means. Flats are then accumulated in an intermediate stack within the intermediate accumulating station until a plurality of individual flats are stacked therewithin. This intermediate stack is then released by movement of the intermediate retaining apparatus to the release position in order to allow movement of this intermediate stack downwardly simultaneously together to the stacking station therebelow. In the stacking station a completed stack of flats will be formed by repeated releases of intermediate stacks from thereabove until the number of flats stacked within the stacking station is to the desired level. At that time the stack of flats located in the stacking station will be exit conveyed outwardly through the outlet defined in the stacker housing for further processing such as movement to a spin dryer or other similar apparatus.

It is an object of the present invention to provide an apparatus and method for placing horizontally oriented flats into a vertically extending stack thereof to facilitate further processing such as drying or transporting or storage thereof.

It is an object of the present invention to provide an apparatus and method for placing horizontally oriented flats into a vertically extending stack thereof which occupies a minimum footprint of floor space.

It is an object of the present invention to provide an apparatus and method for placing horizontally oriented flats into a vertically extending stack thereof which is easily maintained.

It is an object of the present invention to provide an apparatus and method for placing horizontally oriented flats into a vertically extending stack thereof which includes a minimum number of moving parts.

It is an object of the present invention to provide an apparatus and method for placing horizontally oriented flats into a vertically extending stack thereof which can be utilized in multiple laterally positioned configurations of as many as four or more individual rows.

It is an object of the present invention to provide an apparatus and method for placing horizontally oriented flats into a vertically extending stack thereof which allows stacking to continue at the intermediate station even during exit conveying of a completed stack from the stacker station and in this manner greatly increase the operating speed and efficiency of the flat stacking operation.

It is an object of the present invention to provide an apparatus and method for placing horizontally oriented flats into a vertically extending stack thereof which can be used with flats made of various configurations.

It is an object of the present invention to provide an apparatus and method for placing horizontally oriented flats into a vertically extending stack thereof which can be used with flats made of various different materials such as plastic, fibrous materials or any other material.

It is an object of the present invention to provide an apparatus and method for placing horizontally oriented flats into a vertically extending stack thereof which can be used with flats which nest as well as used with flats which do not nest with respect to one another.

It is an object of the present invention to provide an apparatus and method for placing horizontally oriented flats into a vertically extending stack thereof which includes an enhanced infeed system such as a circular roller or brush for urging individual flats to the initial receiving station positioned directly vertically above the final stacking position.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
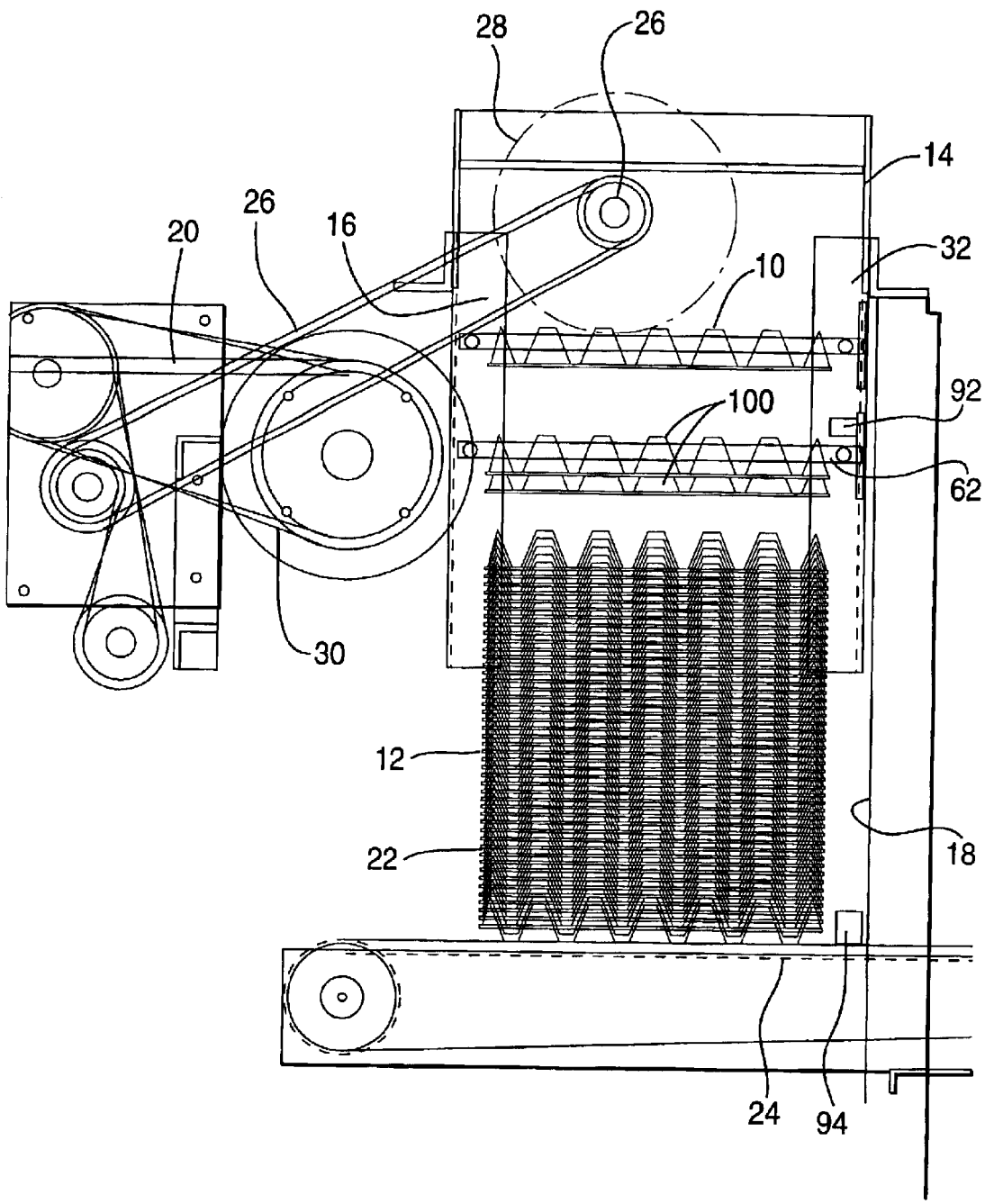
FIG. 1 is a side perspective view of an embodiment of the apparatus of the present invention for placing horizontally oriented flats into a vertically extending stack thereof and method of use.

The present invention provides a unique high speed configuration for efficiently forming stacks 12 of flats 10. Such flats are normally horizontally oriented members which include a shape or configuration designed defined therein to hold a plurality of individual discrete members. One common use of such flats is for holding an array of individual items such as eggs or fruits or other similar material therewithin. The present invention is particularly usable for handling flats configured for holding eggs. It is very important to appreciate that such flats need to be washed and dried after each use for sanitary purposes. Washing needs to occur in a very thorough manner due to the substantial sterilization and other contaminant problems associated with flats 10 which can have organic contaminants extending thereover.

As such, during washing the stacks need to be individually separated from one another. However for handling and sometimes for drying the flats 10 need to be stacked. These stacks preferably include preferably fifteen to twenty individual flats but can be stacked as high as forty or more such flats. The present apparatus provides a unique configuration for receiving on the infeed horizontally oriented stacks such as immediately after washing and for stacking of these flats 10 into vertically extending stacks 12 within a stacker housing 14 for outfeeding therefrom. This apparatus can be operated in one individual line or can have as many as four or more separate and independent operating lines arranged adjacent to one another each receiving horizontally oriented flats one at a time for stacking thereof. Once these stacks of flats are formed they can be handled or processed much more easily such as for drying, shipment or positioning for reuse.

The stacker housing 14 preferably includes an inlet 16 at the upper end and an outlet 18 near the lower end thereof. The inlet 16 is designed to receive individual flats 10 moving therethrough and the outlet 18 is designed to allow stacks of flats 12 to be exit conveyed therethrough.

An inlet conveyor 20 is preferably positioned adjacent to the inlet 16 of housing 14 to move individual flats 10 thereadjacent. The housing defines an upper receiving station 32 immediately adjacent to the inlet 16 for receiving of the flats 10 one at a time. An inlet delivery means 26 may be positioned adjacent to the inlet conveyor 20 and the upper receiving station 32 to facilitate movement of flats 10 individually into the upper receiving station 32. The design of this inlet delivery means 26 may include a cylindrical roller 28 which can be driven by a roller drive means 30. The rotation of the cylindrical roller will cause the outer periphery of the cylindrical roller or cylindrical brush 28 to contact the upper surface of the flat 10 to facilitate and urge movement thereof through the inlet 16 to be fully placed within the upper receiving station 32.

This full placement of the flat 10 into the receiving station 32 is very important because the upper receiving station 32 is oriented in vertical registration immediately above an intermediate accumulating station 62 therebelow and a stacking station 22 further therebelow. The stacking station 22 is positioned adjacent to the outlet conveyor 24 for the purpose of providing stacks of flats 12 thereto for exit conveying thereon through the outlet 18. This vertical registration of the upper receiving station 32 and the intermediate accumulating station 62 therebelow and the stacking station 22 further therebelow is an important aspect of the present invention since it allows direct downward movement of the flats and stacks of flats and greatly facilitates the formation of the final stack of flats 12 within the stacking station 22 which is the ultimate goal of the apparatus of the present invention.

The upper receiving station 32 includes an upper retaining means 34. This upper retaining means preferably is moved between an upper retaining position 36 for holding of a flat 10 in the upper receiving station 32. Upper retaining device 34 is movable selectively to an upper releasing position 38 to allow release of a flat 10 for movement downwardly therefrom toward the intermediate accumulating station 62 located therebelow.

This upper retaining device 34 is accurately controlled for movement between the upper retaining position 36 and the upper releasing position 38 in order to release the flats 10 one at a time for movement downwardly to the intermediate accumulating station 62.

Figure 2:
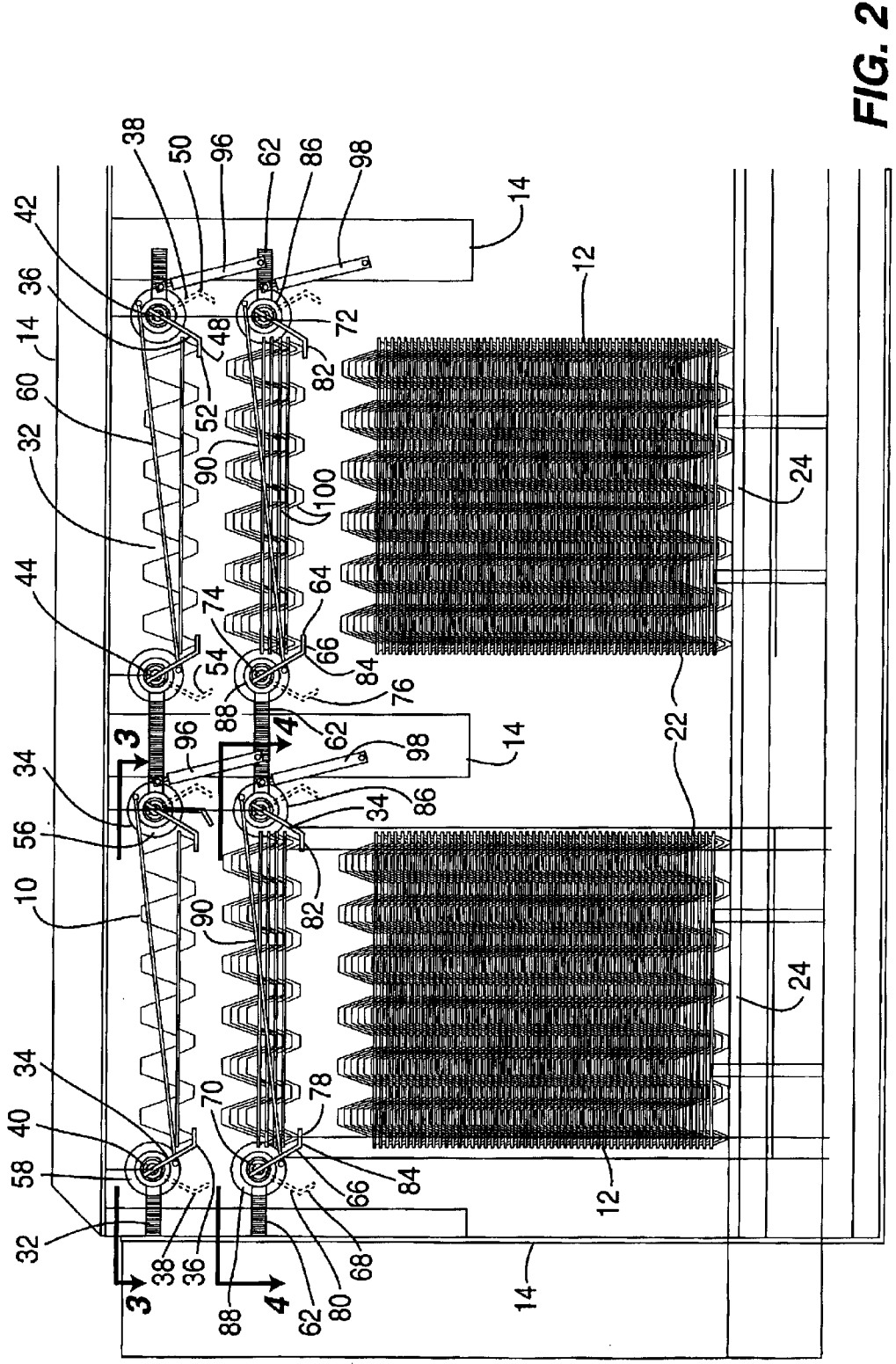
FIG. 2 is an end plan view of the embodiment shown in FIG. 1.
Figure 3:
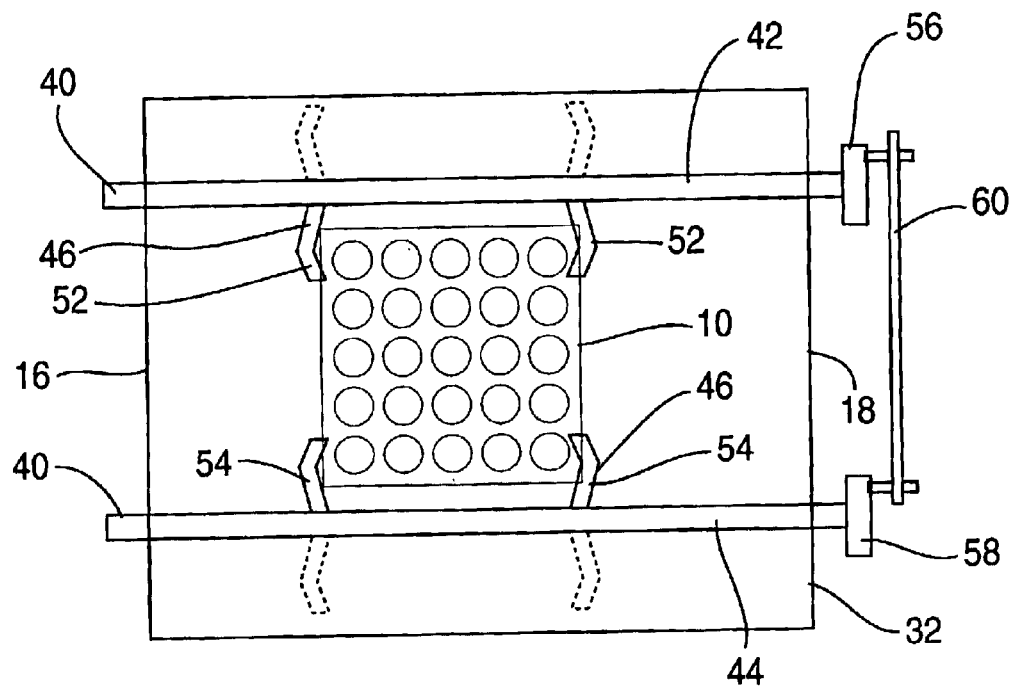
FIG. 3 is a top cross-sectional view of FIG. 2 taken along lines 3—3.
Figure 4:
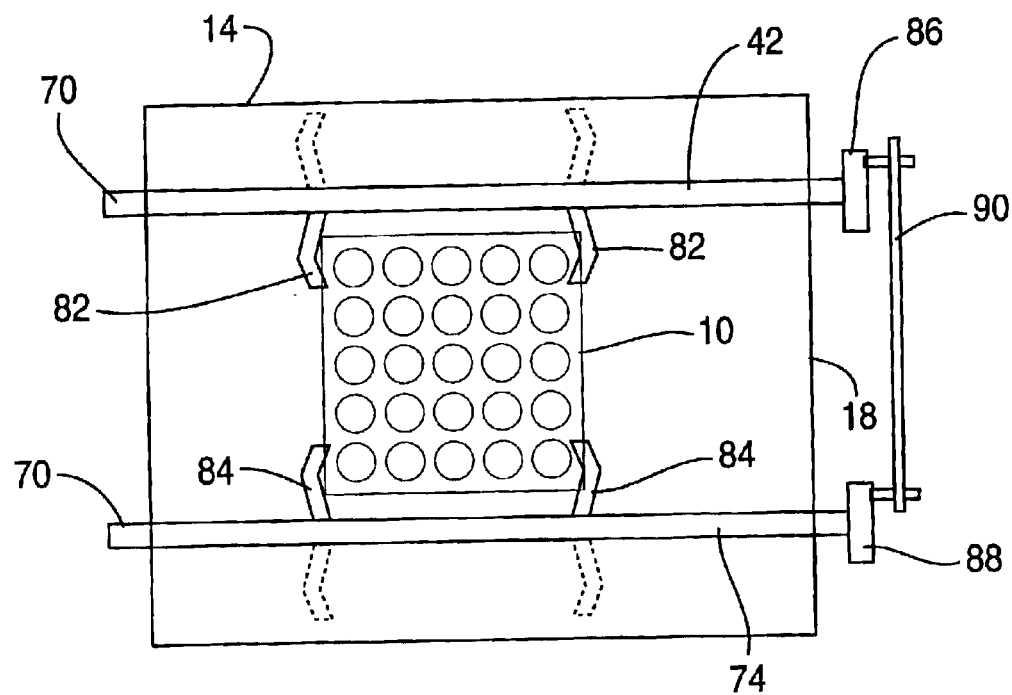
FIG. 4 is a top cross-sectional view of FIG. 2 taken along lines 4—4.

The upper retaining means 34 preferably includes an upper rod mechanism 40 which can include a first upper rod member 42 and a second upper rod member 44. Preferably the first upper rod member 42 is positioned adjacent to one side of a flat 10 when located within the upper receiving station 32 and the second upper rod member 44 is positioned adjacent the opposite end thereof. An upper arm mechanism is secured with respect to the upper rod and is movable along therewith to facilitate movement of the upper arms between a flat retaining position 48 and a flat releasing position 50. The flat retaining position 48 of the upper arm 46 corresponds to the upper retaining position 36 of the upper retaining means 34. In a similar manner the flat releasing position 50 of the upper arm 46 corresponds to the upper releasing position 38 of the upper retaining means 34. Preferably the upper arm includes a first upper arm member 52 which is mounted in the first upper rod member 42 and a second upper arm member 54 which is mounted in the second upper rod member 44. Pivotal movement of the first upper arm member 52 and second upper arm member 54 is achieved by rotational movement of the first upper rod member 42 and the second upper rod member 44 for pivotal movement thereof relative to the housing 14 in which they are mounted. This movement is controlled by a first upper control plate 56 attached to the first upper rod member 42. In a similar manner, a second upper control plate 58 is attached to the second upper rod member 44. As such, rotation of the respective control plates 56 and 58 will cause pivotal movement of the first and second rod members 42 and 44, respectively and simultaneous movement of the first upper arm member 52 and the second upper arm member 54 respectively between the releasing position and the retaining position allowing release of individual flats from the upper receiving station 32 one at a time as accurately controlled. This coordinated movement of the first upper control plate 56 and the second upper control plate 58 is achieved through an upper link 60 which is preferably movably secured to each of these members and extends therebetween. Powering of movement of the upper link 60 and the first and second upper control plates 56 and 58 is preferably achieved by an upper extensible piston means 96 shown best in FIG. 2 for urging movement of the entire upper retaining means 34 between the upper retaining position 36 and the upper releasing position 38. Upon viewing the figures of the present invention, it is clearly apparent that the first and second upper arm members 52 and 54 are movable to a position beneath the flat 10 located in the upper receiving station 32 when retaining the flat in place and to a position outwardly laterally such as to allow the flat 10 to move downwardly toward the intermediate accumulating station therebelow. It is important to understand that the upper receiving station 32 is adapted to handle flats 10 one at a time and will not receive an additional flat until the flat which is located therein is already released for movement toward the intermediate accumulating station 62 therebelow.

The intermediate accumulating station 62 preferably includes an intermediate retaining means 64 which is movable between an intermediate retaining position 66 and an intermediate releasing position 68. When in the intermediate retaining position 66, the intermediate retaining means 64 will hold one or more flats 10 in position in the intermediate accumulating station 62. When the intermediate retaining means 64 is moved to the intermediate releasing position 68, one or more flats 10 retained within the intermediate accumulating station 62 will be released to allow downward movement thereof toward the stacking station 22 therebelow.

Intermediate retaining means 64 will preferably include an intermediate rod mechanism 70. This rod mechanism 70 can preferably include a first intermediate rod member 72 and a second intermediate rod member 74. It should be appreciated that the basic construction of the intermediate retaining means 64 is similar to the basic construction of the upper retaining means 34 except that the intermediate retaining means 64 is designed to remain in the retaining position until a plurality of flats 10 are accumulated therein for release therebelow. On the other hand the upper retaining means 34 is designed to move to the upper releasing position 38 whenever at least one flat 10 is positioned within the upper receiving station 32.

An intermediate arm mechanism 76 is preferably attached with respect to the intermediate rod 70 to be movable therewith. This intermediate arm is movable between a flat retaining position 78 and a flat releasing position 80. In position 80, it will be operable to release a plurality of flats 10 for downward movement thereof toward the stacker station 22 located therebelow. Preferably the intermediate arm mechanism 76 will include a first intermediate arm member 82 and a second intermediate arm member 84. These arm member 82 and 84 will preferably be positionable on opposite sides of the plurality of flats 10 being accumulated within the intermediate accumulating station 62 to facilitate retaining thereof. A first intermediate control plate 86 will be preferably fixedly secured to the first intermediate rod member 72 and the second intermediate control plate 88 will preferably be fixedly secured with respect to the second intermediate rod member 74. In this manner an intermediate link 90 can be movably secured to the first intermediate control plate 86 and the second intermediate control plate 88 to maintain coordinated movement therebetween. This will achieve coordinated movement of the first intermediate arm member 82 and the second intermediate arm member 84 between the flat retaining position within the intermediate accumulating station 62 extending below flats 10 therein and the flat releasing position 80 therewithin.

The intermediate accumulating station 62 will, in this manner, be capable of accumulating a plurality of stacked flats therein for release simultaneously in groups of two or more and preferably four or more downwardly for movement to the stacking station 22. One of the important advantages of the apparatus of the present invention is that the intermediate accumulating station 62 can continue to operate even after it releases the final intermediate stack for movement downwardly to the stacking station 22 after which the stacking station will initiate exit conveying. That is, once the intermediate accumulating station 62 releases the final intermediate stack of flats downwardly such that exit conveying can be initiated, the intermediate stacking operation will continue to build an intermediate stack 100 within the intermediate accumulating station 62. In most prior art configurations the stacking would cease during the time of exiting by the accumulated stack. That is, once the completed final stack initiates exit from the final stacking location 22, there would be a hesitation in operation of the mechanism because no further flats can be allowed to be moved downwardly into the stacking station 22 until it is completely empty and the entire completed stack has exited therefrom. However, with the present apparatus, intermediate stacking within the intermediate stacking station 22 can be allowed to continue since no stacking will actually occur in the stacking station 22 but will occur in the intermediate accumulating station 62 only. Thus, no interference will occur between the exiting completed stack and the intermediate stack 100 being formed in the intermediate accumulating station. As the stacking station 22, initiates exit movement of a completed stack, further flats will be stacked continuously and without interruption within the intermediate accumulating station 62. Normally this intermediate accumulating station 62 is designed to accumulate as many as four such flats. By the time four flats are accumulated within the intermediate accumulating station 62, the completed stack 12 of flats 10 will surely have finally exited and the stacking station 22 will be again available to receive more flats 10 for stacking when the intermediate accumulating station 22 again is ready to move to the releasing position 68 for downward movement. Thus the dead time which normally occurs during exit conveying of a completed stack will be avoided due to the intermediate stacking that occurs within the intermediate accumulating station in the apparatus or method of the present invention.

The present invention will further preferably include an intermediate sensing means 92 positioned adjacent to the intermediate accumulating station 62 for the purpose of determining when a sufficient number of flats 10 have been accumulated within the intermediate stack 100 thereof for release thereof downwardly. When this height is reached the stack is ready to be conveyed outwardly therefrom. The intermediate sensing means 92 will then generate a signal to initiate movement of the intermediate retaining means 64 to the intermediate releasing position 68 to allow release of the accumulated intermediate stack 100 of flats 10 for movement thereof downwardly toward the stacking station 22.

The intermediate arms are timed to open after the upper arms have opened a predetermined number of times, which is usually chosen to be four times for accumulating four flats at a time but the number could be any predetermined value.

Preferably the present invention will also include a stack sensing means 94 which will sense whenever exit conveying occurs and will transmit this signal to the intermediate accumulating station 62 to prevent movement thereof to the intermediate releasing position 68 to prevent the release of flats 10 downwardly until the stack of flats 12 has completely exited the stacking station 22. This stack sensing means 94 is a backup sensing means to assure smooth operation. In normal operation the stack sensing means 94 will not be needed since the exit conveying will be initiated whenever an intermediate stack 100 moves downwardly such that a completed stack is formed. Thus immediate exit conveying will occur and the intermediate accumulating station 62 will need some additional time to accumulate sufficient individual stacks 10 therein such that it is ready for movement to the intermediate releasing position 68. Thus the stack sensing means 94 is a backup system to be sure that intermediate stack 100 of flats 10 are not released for downward movement from the intermediate accumulating station 62 during exit conveying of the completed stack by the stacking station 22.

Movement of the intermediate arm mechanism 76 between the flat retaining position 78 and the flat releasing position 80 is controlled by an intermediate extensible piston means 98. This piston is connected with respect to the mechanism of the first intermediate control plate 86, second intermediate control plate 88 and intermediate link 90 in such a manner as to control movement thereof between the flat releasing position and the flat retaining position and vice versa.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for placing horizontally oriented flats into a vertically extending stack thereof comprising:
   A. a housing means defining an inlet means therein for receiving of flats individually therethrough for facilitating positioning thereof into a vertically extending stack of horizontally oriented flats, said housing means further defining an outlet means for allowing exiting of stacks of flats therefrom;
   B. an inlet conveying means operative to transport the flats individually to said inlet means of said housing means for facilitating stacking thereof;
   C. a stacking station means located within said housing means and adapted to receive flats from within said housing means thereabove in registration therewith to facilitate vertical stacking of horizontally oriented flats therein;
   D. an outlet conveying means extending to said stacking station means within said housing means through said outlet means defined therein, said outlet conveying means extending to said stacking station means and being operable to receive a stack of flats therefrom for exit conveying thereof through said outlet means of said housing means;
   E. an inlet delivery means operative to facilitate movement of individual flats from said inlet conveying means into said housing means;
   F. an upper receiving station means located within said housing means adjacent said inlet means of said housing means and operative to receive a single flat therewithin for orientation thereof above said stacking station located therebelow and in vertical registration therewith; and
   G. an intermediate accumulating station means located below said upper receiving station means and operative to receive individual flats therefrom for orientation thereof above said stacking station located therebelow and in vertical registration therewith, said intermediate accumulating station adapted to receive and retain a plurality of individual flats therewithin for simultaneous release together downwardly therefrom to facilitate stacking within said stacking station means therebelow; and
   H. a stack sensing means operative to monitor the exiting movement of a stack from said stacking station means through said outlet means and being operative to prevent release of flats downwardly from said intermediate accumulating station means toward said stacking station means responsive to exiting movement of a stack of flats from said stacking station means through said outlet means.

2. An apparatus for placing horizontally oriented flats into a vertically extending stack thereof as defined in claim 1 wherein said inlet delivery means includes a cylindrical roller means positioned adjacent said inlet conveying means to contact flats being transported thereon for urging movement thereof through said inlet means into said upper receiving station means.

3. An apparatus for placing horizontally oriented flats into a vertically extending stack thereof as defined in claim 2 wherein said cylindrical roller means comprises a cylindrical brush member.

4. An apparatus for placing horizontally oriented flats into a vertically extending stack thereof as defined in claim 2 further comprising a roller drive means operatively attached with respect to said cylindrical roller means for rotatably driving movement thereof to facilitate urging of flats to move from a position on said inlet conveying means to said upper receiving station means.

5. An apparatus for placing horizontally oriented flats into a vertically extending stack thereof as defined in claim 1 wherein said outlet conveying means extends below said stacking station means and wherein said stacking station means is adapted to stack horizontally oriented flats vertically directly upon said outlet conveying means to facilitate exit conveying thereof through said outlet means.

6. An apparatus for placing horizontally oriented flats into a vertically extending stack thereof as defined in claim 1 wherein said upper receiving station means includes an upper retaining means selectively movable pivotally between an upper retaining position for holding of a single flat within said upper receiving station means and an upper releasing position for release of a single flat for allowing movement thereof downwardly to said intermediate accumulating station means located therebelow.

7. An apparatus for placing horizontally oriented flats into a vertically extending stack thereof as defined in claim 6 wherein said upper retaining means includes:
   A. an upper rod means being mounted pivotally movably within said housing means at a location laterally adjacent to a single flat positioned within said upper retaining means; and B. an upper arm means secured to said upper rod means and pivotally movable therewith between a flat retaining position extending below a flat for holding thereof in said upper receiving station means and a flat releasing position adjacent to a flat for allowing release of a single flat downwardly therefrom to said intermediate accumulating station means therebelow.

8. An apparatus for placing horizontally oriented flats into a vertically extending stack thereof as defined in claim 7 wherein said upper rod means comprises;
   A. a first upper rod member being mounted pivotally movably within said housing means at a location laterally adjacent to a flat positioned within said upper retaining means; and
   B. a second upper rod member being mounted pivotally movably mounted within said housing means at a location laterally adjacent to a flat positioned within said upper retaining means at a position spatially distant from said first upper rod member with the flat positioned therebetween.

9. An apparatus for placing horizontally oriented flats into a vertically extending stack thereof as defined in claim 8 wherein said upper arm means comprises:
   A. a first upper arm means secured to said first upper rod member and pivotally movable therewith between a flat retaining position extending below a single flat for holding thereof in said upper receiving station means and a flat releasing position adjacent a single flat for allowing release of thereof downwardly therefrom to said intermediate accumulating station means therebelow; and
   B. a second upper arm means secured to said second upper rod member and pivotally movable therewith between a flat retaining position extending below a flat for holding thereof in said upper receiving station means and a flat releasing position adjacent a flat for allowing release thereof downwardly therefrom to said intermediate accumulating station means therebelow.

10. An apparatus for placing horizontally oriented flats into a vertically extending stack thereof as defined in claim 9 wherein said upper retaining means further includes:
   A. a first upper control plate fixedly secured to said first upper rod means and pivotally movable therewith;
   B. a second upper control plate fixedly secured to said second upper rod means and pivotally movable therewith;
   C. an upper link means attached to said first upper control plate and said second upper control plate and being operative to cause simultaneous pivotal movement of said first upper arm means and said second upper arm means between the flat releasing position and the flat retaining position thereof to coordinate movement of said first upper arm means and said second upper arm means between the flat retaining position and the flat releasing position.

11. An apparatus for placing horizontally oriented flats into a vertically extending stack thereof as defined in claim 10 wherein said upper link means is movably attached to said first upper control plate and to said second upper control plate to facilitate coordinated movement thereof between a flat releasing position and a flat retaining position thereof.

12. An apparatus for placing horizontally oriented flats into a vertically extending stack thereof as defined in claim 11 wherein said upper link means is attached to said first upper control plate above said first upper rod member and is also attached to said second upper control plate below said second upper rod member to facilitate coordinated opposed pivotal movement of said first upper rod member and said second upper rod member.

13. An apparatus for placing horizontally oriented flats into a vertically extending stack thereof as defined in claim 1 wherein said intermediate receiving station means includes an intermediate retaining means selectively movable pivotally between an intermediate retaining position for holding of at least one flat within said intermediate receiving station means and an intermediate releasing position for release of at least one flat for allowing movement thereof downwardly to said stacking station means located therebelow.

14. An apparatus for placing horizontally oriented flats into a vertically extending stack thereof as defined in claim 13 wherein said intermediate retaining means includes:
   A. an intermediate rod means being mounted pivotally movably within said housing means at a location laterally adjacent to at least one flat positioned within said intermediate retaining means; and
   B. an intermediate arm means secured to said intermediate rod means and pivotally movable therewith between a flat retaining position extending below at least one flat for holding thereof in said intermediate receiving station means and a flat releasing position adjacent to at least one flat for allowing release thereof downwardly therefrom to said stacking station means therebelow.

15. An apparatus for placing horizontally oriented flats into a vertically extending stack thereof as defined in claim 14 wherein said intermediate rod means comprises:
   A. a first intermediate rod member being mounted pivotally movably within said housing means at a location laterally adjacent to at least one flat positioned within said intermediate retaining means; and
   B. a second intermediate rod member being mounted pivotally movably mounted within said housing means at a location laterally adjacent to at least one flat positioned within said intermediate retaining means at a position spatially distant from said first intermediate rod member with at least one flat positioned therebetween.

16. An apparatus for placing horizontally oriented flats into a vertically extending stack thereof as defined in claim 15 wherein said intermediate arm means comprises:
   A. a first intermediate arm means secured to said first intermediate rod member and pivotally movable therewith between a flat retaining position extending below at least one flat for holding thereof in said intermediate receiving station means and a flat releasing position adjacent at least one flat for allowing release of thereof downwardly therefrom to said stacking station means therebelow; and
   B. a second intermediate arm means secured to said second intermediate rod member and pivotally movable therewith between a flat retaining position extending below at least one flat for holding thereof in said intermediate receiving station means and a flat releasing position adjacent at least one flat for allowing release thereof downwardly therefrom to said stacking station means therebelow.

17. An apparatus for placing horizontally oriented flats into a vertically extending stack thereof as defined in claim 16 wherein said intermediate retaining means further includes:
   A. a first intermediate control plate fixedly secured to said first intermediate rod means and pivotally movable therewith;

B. a second intermediate control plate fixedly secured to said second intermediate rod means and pivotally movable therewith;

C. an intermediate link means attached to said first intermediate control plate and said second intermediate control plate and being operative to cause simultaneous pivotal movement of said first intermediate arm means and said second intermediate arm means between a flat releasing position and a flat retaining position thereof.

18. An apparatus for placing horizontally oriented flats into a vertically extending stack thereof as defined in claim 17 wherein said intermediate link means is movably attached to said first intermediate control plate and said second intermediate control plate to facilitate coordinated movement thereof between a flat releasing position and a flat retaining position thereof.

19. An apparatus for placing horizontally oriented flats into a vertically extending stack thereof as defined in claim 18 wherein said intermediate link means is attached to said first intermediate control plate above said first intermediate rod member and is also attached to said second intermediate control plate below said second intermediate rod member to facilitate coordinated opposed pivotal movement of said first intermediate rod member and said second intermediate rod member.

20. An apparatus for placing horizontally oriented flats into a vertically extending stack thereof as defined in claim 1 wherein said intermediate retaining means is operative in the steady state to be located in the retaining position and is operative to move to the releasing position responsive to at least four flats being located within said intermediate accumulating station for release therebelow and is operative to return to the retaining position subsequent to release thereof.

21. An apparatus for placing horizontally oriented flats into a vertically extending stack thereof as defined in claim 1 further including an intermediate sensing means for monitoring the presence of flats retained within said intermediate accumulating station means and operative to urge movement of said intermediate retaining means to the releasing position only after at least four flats are accumulated therewithin.

22. An apparatus for placing horizontally oriented flats into a vertically extending stack thereof comprising:

A. a housing means defining an inlet means therein for receiving of individual flats therethrough for facilitating positioning thereof into a vertical stack of horizontally oriented flats, said housing means further defining an outlet means for allowing exiting of stacks of flats therefrom;

B. a inlet conveying means operative to transport the individual flats to said inlet means of said housing means for facilitating stacking thereof;

C. a stacking station means located within said housing means and adapted to receive flats from within said housing means thereabove in registration therewith to facilitate vertical stacking of horizontally oriented flats therein;

D. an outlet conveying means extending to said stacking station means within said housing means through said outlet means defined therein, said outlet conveying means extending to said stacking station means and being operable to receive a stack of flats therefrom for exit conveying thereof through said outlet means of said housing means, said outlet conveying means extending below said stacking station means and said stacking station means being adapted to stack horizontally oriented flats vertically directly upon said outlet conveying means to facilitate exiting conveying thereof through said outlet means;

E. an inlet delivery means operative to urge movement of individual flats from said inlet conveying means into said housing means, said inlet delivery means including a cylindrical roller brush means positioned adjacent said inlet conveying means to contact flats being transported thereon for urging thereof to move through said inlet means into said housing means;

F. a roller drive means operatively attached with respect to said cylindrical roller brush means for rotatably driving movement thereof to facilitate urging of flats to move from a position on said inlet conveying means into said housing means through said inlet means thereof;

G. an upper receiving station means located within said housing means adjacent said inlet means of said housing means and operative to receive a single flat therewithin for orientation thereof above said stacking station located therebelow and in vertical registration therewith, said upper receiving station means including an upper retaining means selectively movable pivotally between an upper retaining position for holding of a flat within said upper receiving station means and an upper releasing position for release of a single flat for allowing movement thereof downwardly to a position therebelow, said upper retaining means including:

(1) an upper rod means being mounted pivotally movably within said housing means at a location laterally adjacent to a flat positioned within said upper retaining means, said upper rod means comprising:

(a) a first upper rod member being mounted pivotally movably within said housing means at a location laterally adjacent to a flat positioned within said upper retaining means;

(b) a second upper rod member being mounted pivotally movably mounted within said housing means at a location laterally adjacent to a flat positioned within said upper retaining means at a position spatially distant from said first upper rod member with the flat positioned therebetween;

(2) an upper arm means secured to said upper rod means and pivotally movable therewith between a flat retaining position extending below a flat for holding thereof in said upper receiving station means and a flat releasing position adjacent to a flat for allowing release of a flat downwardly therefrom, said upper arm means comprising:

(a) a first upper arm member secured to said first upper rod member and pivotally movable therewith between a flat retaining position extending below a flat for holding thereof in said upper receiving station means and a flat releasing position adjacent a flat for allowing release of thereof downwardly therefrom;

(b) a second upper arm member secured to said second upper rod member and pivotally movable therewith between a flat retaining position extending below a flat for holding thereof in said upper receiving station means and a flat releasing position adjacent a flat for allowing release thereof downwardly therefrom;

(3) a first upper control plate fixedly secured to said first upper rod member and pivotally movable therewith;

(4) a second upper control plate fixedly secured to said second upper rod member and pivotally movable therewith;

(5) an upper link means attached to said first upper control plate and said second upper control plate and being operative to cause simultaneous pivotal movement of said first upper arm member and said second upper arm member between the flat releasing position and the flat retaining position thereof, said upper link means being movably attached to said first upper control plate and to said second upper control plate to facilitate coordinated movement thereof between a flat releasing position and a flat retaining position thereof, said upper link means being attached to said first upper control plate above said first upper rod member and also being attached to said second upper control plate below said second upper rod member to facilitate coordinated opposed pivotal movement of said first upper rod member and said second upper rod member;

H. an intermediate accumulating station means located below said upper receiving station means and operative to receive individual flats moving downwardly from said upper retaining means of said upper receiving station means for orientation thereof above said stacking station located therebelow and in vertical registration therewith, said intermediate accumulating station adapted to receive and retain a plurality of individual flats therewithin for simultaneous release together downwardly therefrom to facilitate stacking within said stacking station means therebelow, said intermediate receiving station means including an intermediate retaining means selectively movable pivotally between an intermediate retaining position for holding of at least one flat within said intermediate receiving station means and an intermediate releasing position for release of at least one flat for allowing movement thereof downwardly to said stacking station means located therebelow, said intermediate retaining means including:

(1) an intermediate rod means being mounted pivotally movably within said housing means at a location laterally adjacent to at least one flat positioned within said intermediate retaining means, said intermediate rod means comprising:

(a) a first intermediate rod member being mounted pivotally movably within said housing means at a location laterally adjacent to at least one flat positioned within said intermediate retaining means;

(b) a second intermediate rod member being mounted pivotally movably mounted within said housing means at a location laterally adjacent to at least one flat positioned within said intermediate retaining means at a position spatially distant from said first intermediate rod member with at least one flat positioned therebetween;

(2) an intermediate arm means secured to said intermediate rod means and pivotally movable therewith between a flat retaining position extending below at least one flat for holding thereof in said intermediate receiving station means and a flat releasing position adjacent to at least one flat for allowing release thereof downwardly therefrom to said stacking station means therebelow, said intermediate arm means comprising:

(a) a first intermediate arm member secured to said first intermediate rod member and pivotally movable therewith between a flat retaining position extending below at least one flat for holding thereof in said intermediate receiving station means and a flat releasing position adjacent at least one flat for allowing release of thereof downwardly therefrom to said stacking station means therebelow;

(b) a second intermediate arm member secured to said second intermediate rod member and pivotally movable therewith between a flat retaining position extending below at least one flat for holding thereof in said intermediate receiving station means and a flat releasing position adjacent at least one flat for allowing release thereof downwardly therefrom to said stacking station means therebelow;

(c) a first intermediate control plate fixedly secured to said first intermediate rod member and pivotally movable therewith;

(d) a second intermediate control plate fixedly secured to said second intermediate rod member and pivotally movable therewith;

(e) an intermediate link means attached to said first intermediate control plate and said second intermediate control plate and being operative to cause simultaneous pivotal movement of said first intermediate arm member and said second intermediate arm member between a flat releasing position and a flat retaining position thereof, said intermediate link means being movably attached to said first intermediate control plate and said second intermediate control plate to facilitate coordinated movement thereof between a flat releasing position and a flat retaining position thereof, said intermediate link means being attached to said first intermediate control plate above said first intermediate rod member and also being attached to said second intermediate control plate below said second intermediate rod member to facilitate coordinated pivotal movement of said first intermediate rod member and said second intermediate rod member in the opposite pivotal direction together, said intermediate retaining means being operative in the steady state position to be located in the retaining position and being operative to move to the releasing position responsive to at least four flats being located within said intermediate accumulating station for release therebelow and is operative to return to the retaining position subsequent to release thereof;

I. an intermediate sensing means for monitoring the presence of flats retained within said intermediate accumulating station means and operative to urge movement of said intermediate retaining means to the releasing position only after at least four flats are accumulated therewithin; and J. a stack sensing means operative to monitor the exiting movement of a stack from said stacking station means through said outlet means and being operative to prevent release of flats downwardly from said intermediate accumulating station means toward said stacking station means responsive to exiting movement of a stack of flats from said stacking station means through said outlet means.

23. A method for organizing horizontally oriented flats into a vertically extending stack thereof comprising:

A. initial conveying of horizontally oriented flats one at a time into an upper receiving station of a stacker housing;

B. registering of a flat positioned in the upper receiving station directly above an intermediate accumulating station positioned therebelow within the stacker housing and above a stack station positioned further distant therebelow within a stacker housing;

C. releasing of flats one at a time from the upper receiving station to allow movement thereof downwardly into the intermediate accumulating station positioned therebelow;

D. accumulating flats in an intermediate stack within the intermediate accumulating station until a plurality of flats are stacked therewithin;

E. releasing of the intermediate stack of flats to allow same to move downwardly simultaneously together into the stacking station therebelow;

F. forming a completed stack of flats by allowing a plurality of intermediate stacks, each including a plurality of individual flats, to move downwardly from the intermediate accumulating station to the stacking station therebelow; and G. exit conveying of the completed stack of flats outwardly through an outlet defined in the stacker housing; and H sensing for exiting movement of a stack from said stacking station and being operative to prevent release of flats downwardly from the intermediate accumulating station means toward the stacking station during exiting movement of a stack of flats from within the stacking station means.

24. A method for organizing horizontally oriented flats into a vertically extending stack thereof as defined in claim 23 wherein said accumulating flats in an intermediate stack is performed until at least four separate flats are present within the intermediate stack prior to releasing thereof downwardly to the stacking station.

25. A method for organizing horizontally oriented flats into a vertically extending stack thereof as defined in claim 23 further comprising urging delivery of each single horizontally oriented flats from initial conveying to the upper receiving station.

26. A method for organizing horizontally oriented flats into a vertically extending stack thereof as defined in claim 25 wherein said urging delivery of oriented flats is performed by rotating of a cylindrical brush member in abutment with each conveyed flat.

27. A method for organizing horizontally oriented flats into a vertically extending stack thereof as defined in claim 26 wherein the cylindrical brush member is positioned immediately adjacent the upper receiving station of the stacker housing and the initial conveyor to facilitate abutment with individual flats being conveyed for urging movement thereof into the upper receiving station for registering thereof.

28. A method for organizing horizontally oriented flats into a vertically extending stack thereof as defined in claim 25 wherein said urging delivery of oriented flats is performed by rotating of a cylindrical brush member in abutment with each conveyed flat positioned therebelow.

29. A method for organizing horizontally oriented flats into a vertically extending stack thereof as defined in claim 23 further including intermediate sensing of the number of flats retained within the intermediate accumulating station to allow release thereof downwardly toward the stacking station only after at least four flats have been accumulated therewithin.

30. A method for organizing horizontally oriented flats into a vertically extending stack thereof as defined in claim 23 wherein said forming a completed stack of flats is performed directly upon an exit conveyor to facilitate exit conveying of the completed stack of flats outwardly through an outlet defined in the stacker housing.

31. A method for organizing horizontally oriented flats into a vertically extending stack thereof as defined in claim 23 wherein said releasing of flats one at a time from the upper receiving station is performed by removal of a plurality of upper arm members from a retaining position extending beneath the upper receiving station to a releasing position laterally displaced outwardly therefrom to release flats one at a time for movement toward an intermediate accumulating position therebelow.

32. A method for organizing horizontally oriented flats into a vertically extending stack thereof as defined in claim 23 wherein said releasing of the accumulated plurality of flats from the intermediate accumulating station is performed by removal of a plurality of intermediate arm members from a retaining position extending beneath the intermediate accumulating station to a releasing position laterally displaced outwardly therefrom to release a plurality of accumulated flats for movement downwardly toward the stacking station.

* * * * *